US012668911B1

(12) United States Patent (10) Patent No.: US 12,668,911 B1
Song et al. (45) Date of Patent: Jun. 30, 2026

(54) WASHING MACHINE DRIVE SYSTEM

(71) Applicant: LG ELECTRONICS INC., Seoul (KR)

(72) Inventors: Junyoung Song, Seoul (KR); Youngchan Ahn, Seoul (KR); Hyounguk Nam, Seoul (KR); Seungsuk Oh, Seoul (KR); Kyeonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 18/841,015

(22) PCT Filed: May 18, 2023

(86) PCT No.: PCT/KR2023/006749
§ 371 (c)(1),
(2) Date: Aug. 23, 2024

(87) PCT Pub. No.: WO2024/237374
PCT Pub. Date: Nov. 21, 2024

(51) Int. Cl.
*D06F 37/30* (2020.01)
*H02K 7/11* (2006.01)
*H02K 7/116* (2006.01)

(52) U.S. Cl.
CPC ............. *D06F 37/304* (2013.01); *H02K 7/11* (2013.01); *H02K 7/116* (2013.01)

(58) Field of Classification Search
CPC .................................................. D06F 37/304
See application file for complete search history.

(56) References Cited

U.S. PATENT DOCUMENTS 11,168,431 B2    11/2021  Lee et al.
2016/0222572 A1   8/2016  Kim et al.
(Continued)

FOREIGN PATENT DOCUMENTS

JP       2020-124381 A     8/2020
JP       2023-020905 A     2/2023
(Continued)

OTHER PUBLICATIONS

Extended European Search Report dated Mar. 24, 2025, issued in Application No. 23921579.1.
(Continued)

*Primary Examiner* — Spencer E. Bell
(74) *Attorney, Agent, or Firm* — KED & ASSOCIATES, LLP

(57) ABSTRACT

A washing machine drive system is provided. A washing machine drive system according to an aspect of the present disclosure includes a housing, a motor stator coupled to the housing, a rotor facing the motor stator, an output shaft bearing-coupled to the housing, a planetary gear set coupled to the rotor and spline-coupled to an outer peripheral surface of the output shaft, a clutch stator coupled to the motor stator, and a clutch actuator spline-coupled to an outer peripheral surface of the planetary gear set so as to be vertically movable and facing the clutch stator, in which the clutch stator includes first to third coils arranged in parallel in a vertical direction, the clutch actuator is fixed to the rotor and transmits rotational force of the rotor to the output shaft at a 1:1 ratio when current is supplied to the first coil, the clutch actuator is fixed to the clutch stator, reduces the rotational force of the rotor at a gear ratio of n:1, and transmits the reduced rotational force to the output shaft when current is supplied to the third coil, and the clutch
(Continued)

actuator is disengaged from the rotor or the clutch stator when current is supplied to the second coil.

20 Claims, 17 Drawing Sheets

(56)                    References Cited

U.S. PATENT DOCUMENTS

2020/0232143 A1      7/2020  Sonoda et al.
2024/0384457 A1*   11/2024  Funakoshi ............. D06F 37/36

FOREIGN PATENT DOCUMENTS

KR       10-2012-0060689  A       6/2012
KR       10-2015-0039695  A       4/2015
KR             10-2081359  B1      2/2020
WO       WO 2023/008794          2/2023

OTHER PUBLICATIONS

International Search Report dated Feb. 16, 2024 issued in Application No. PCT/KR2023/006749.

* cited by examiner

【FIG. 1】
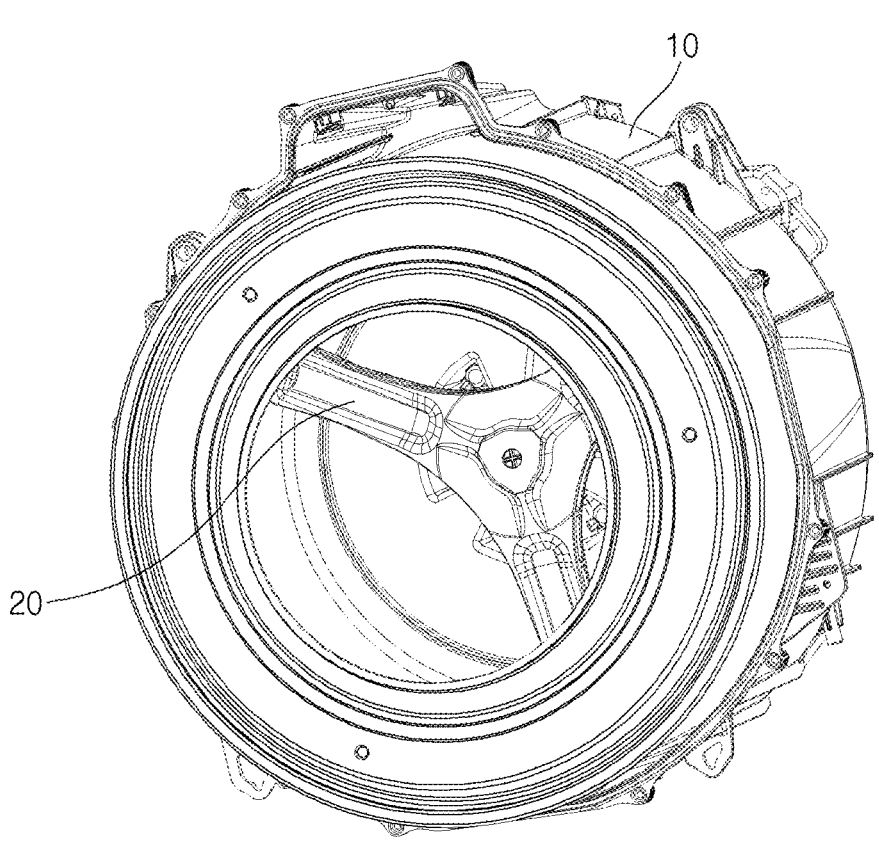

【FIG. 2】
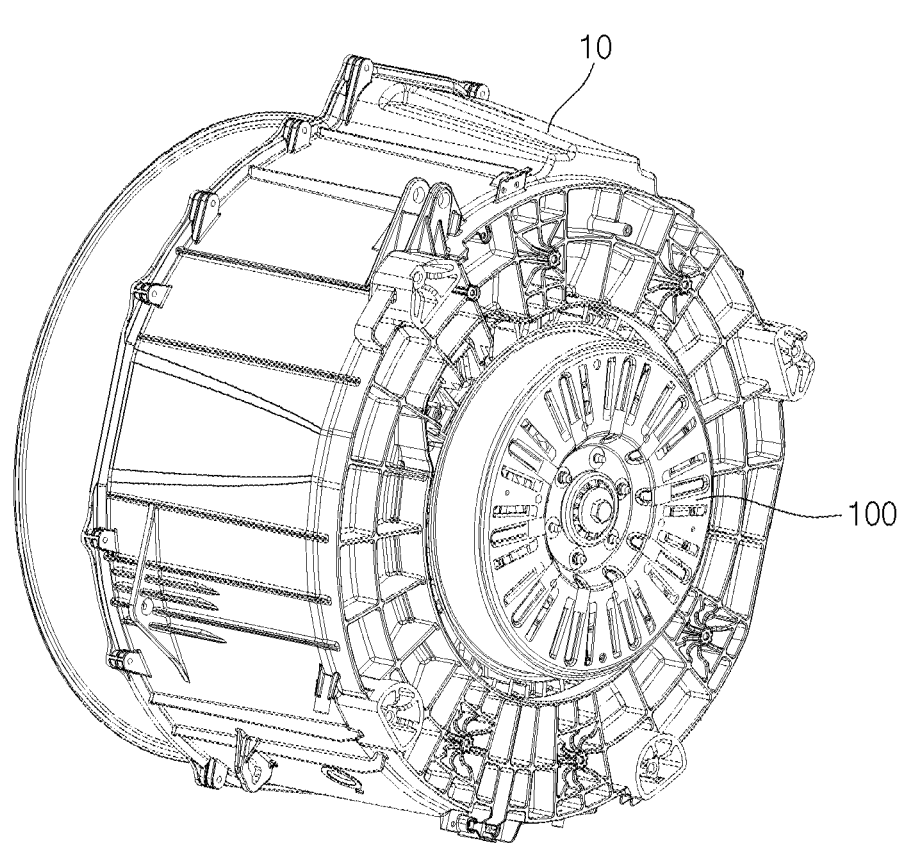

【FIG. 3】
100
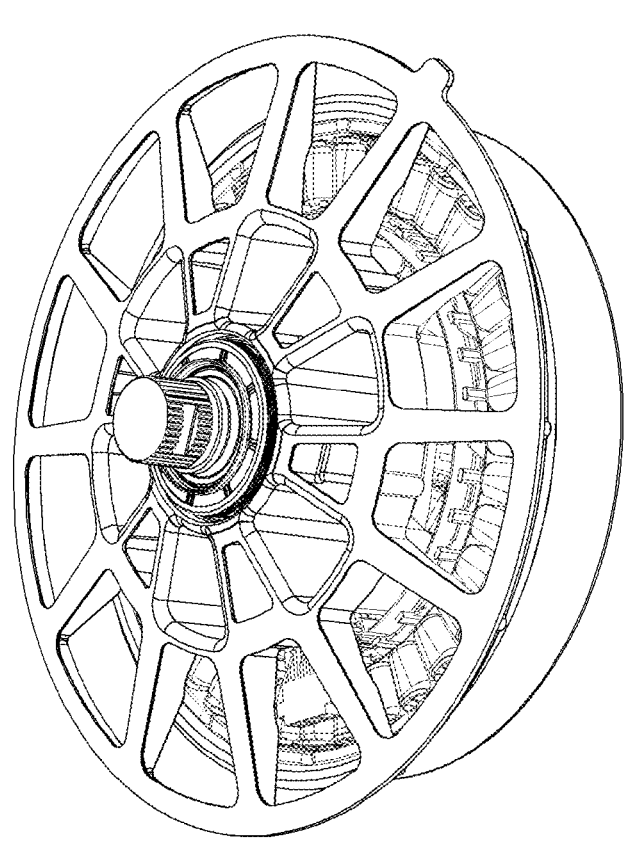

【FIG. 4】
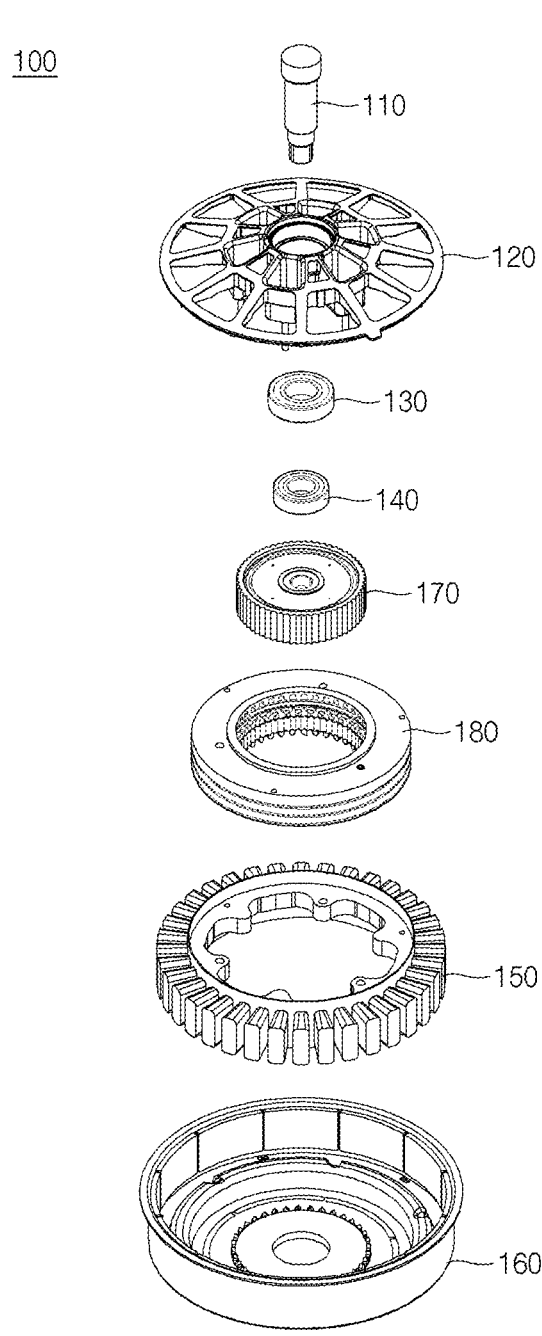

【FIG. 5】
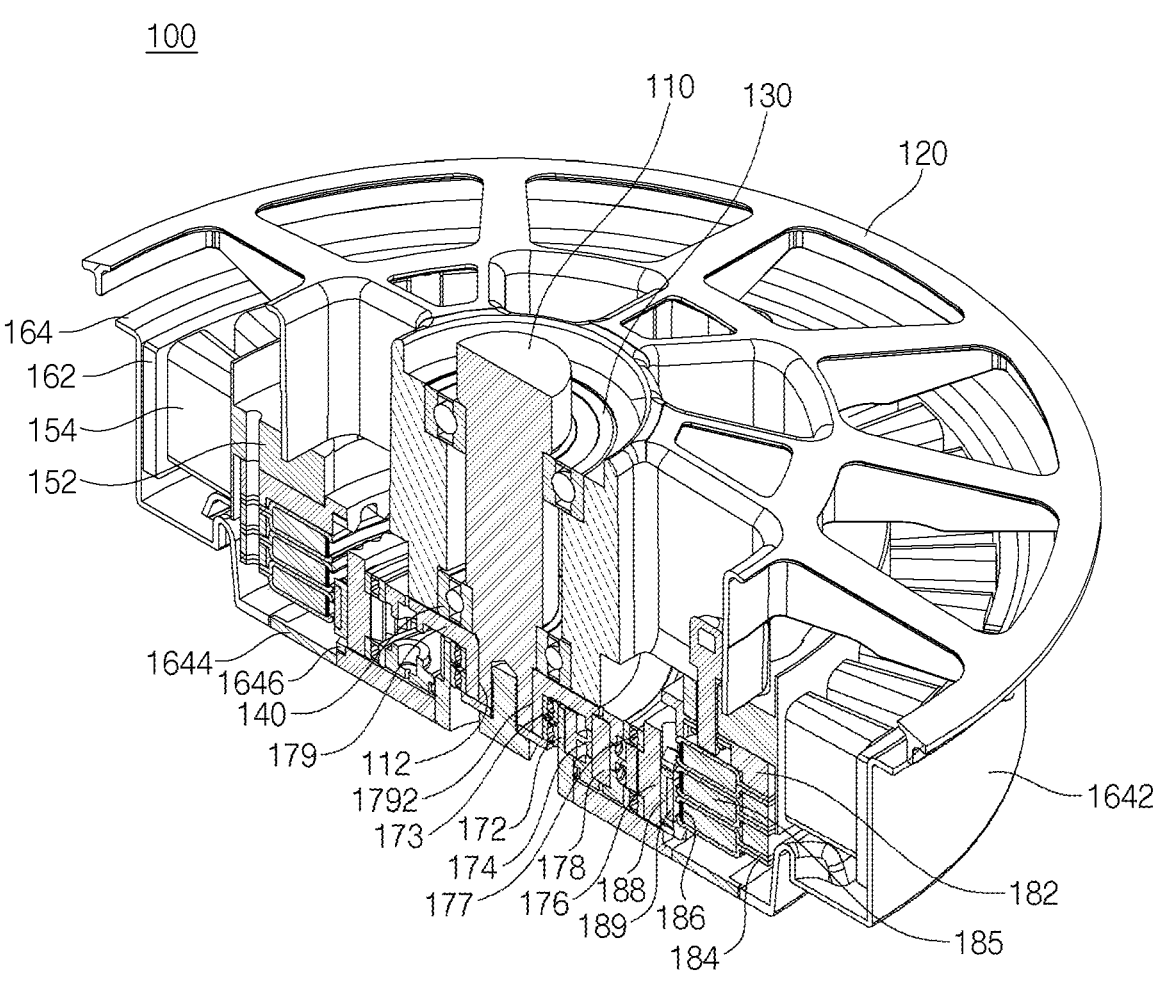

【FIG. 6】
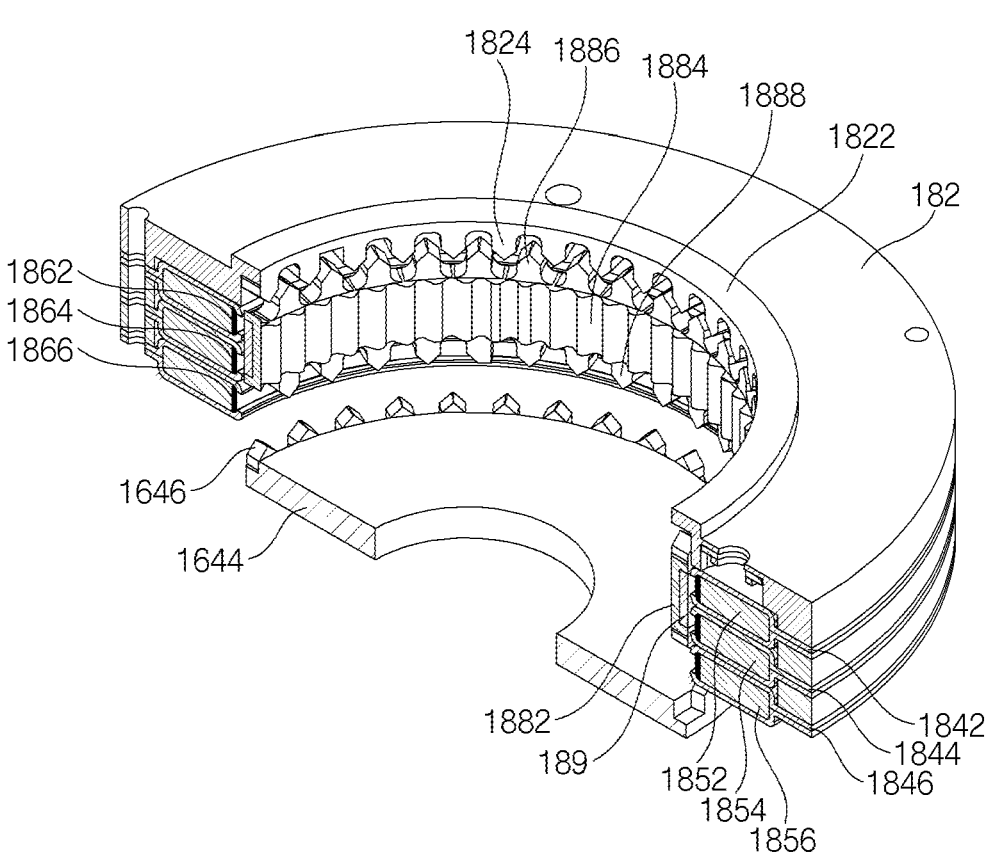

【FIG. 7】
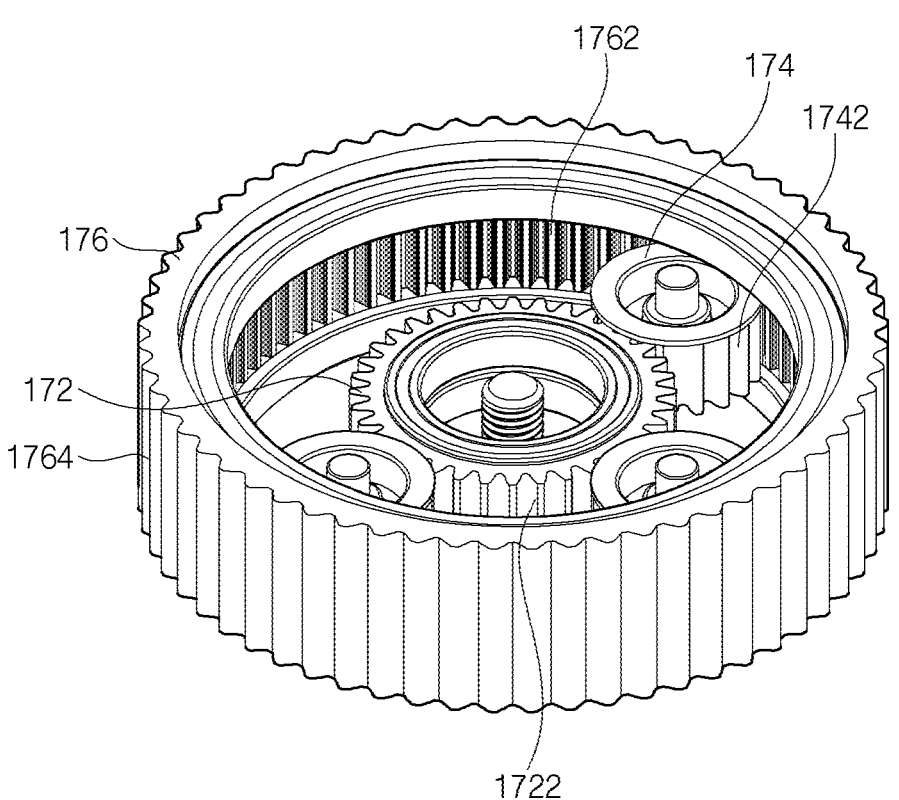

【FIG. 8】
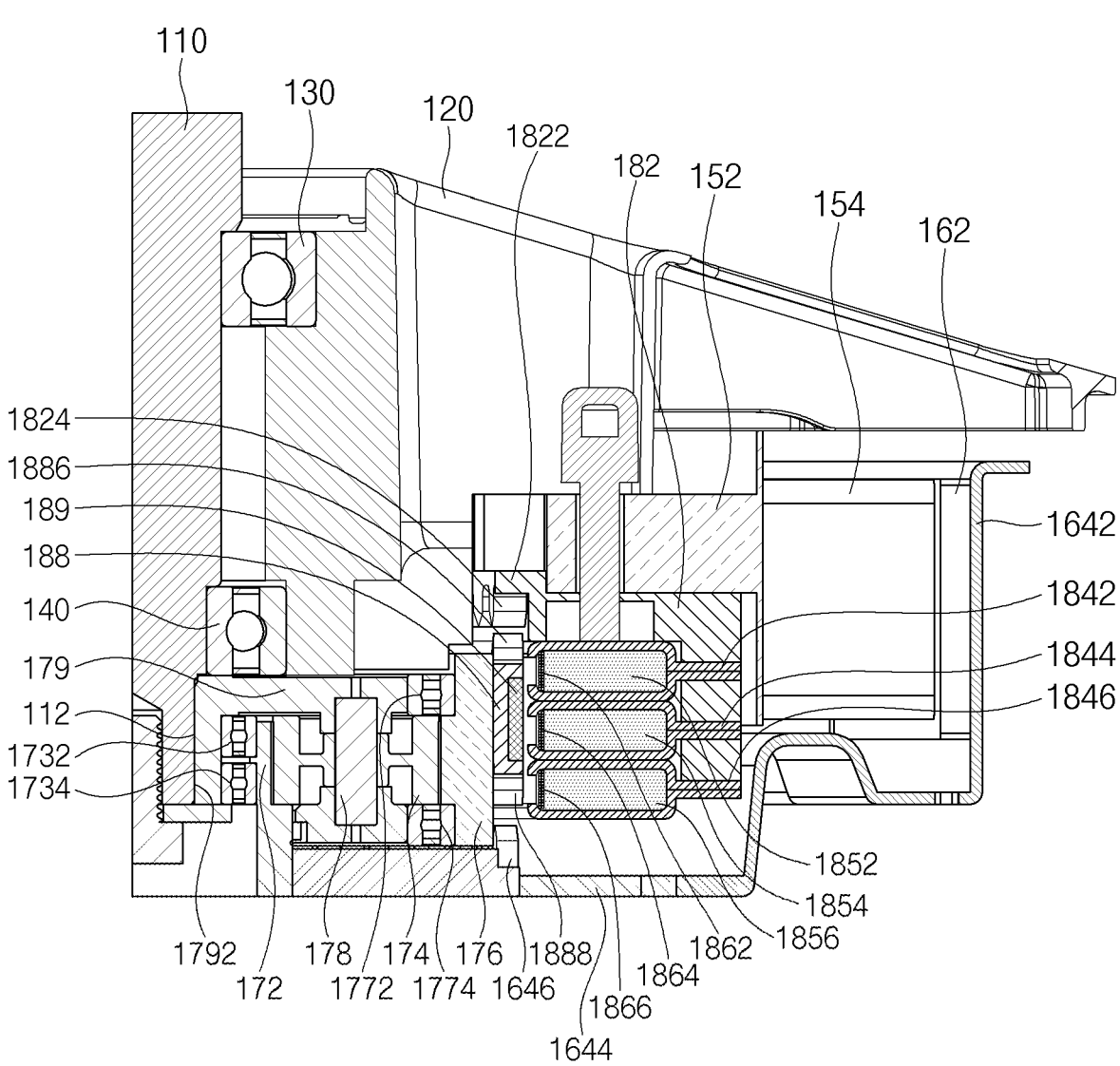

【FIG. 9】
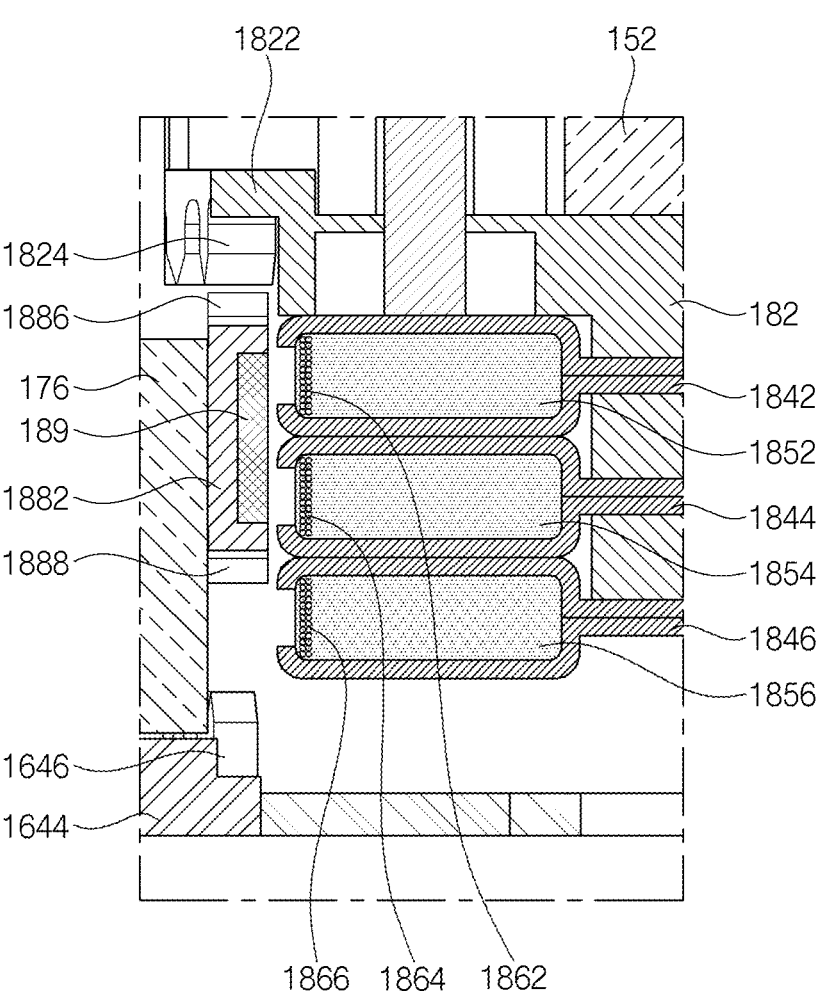

【FIG. 10】
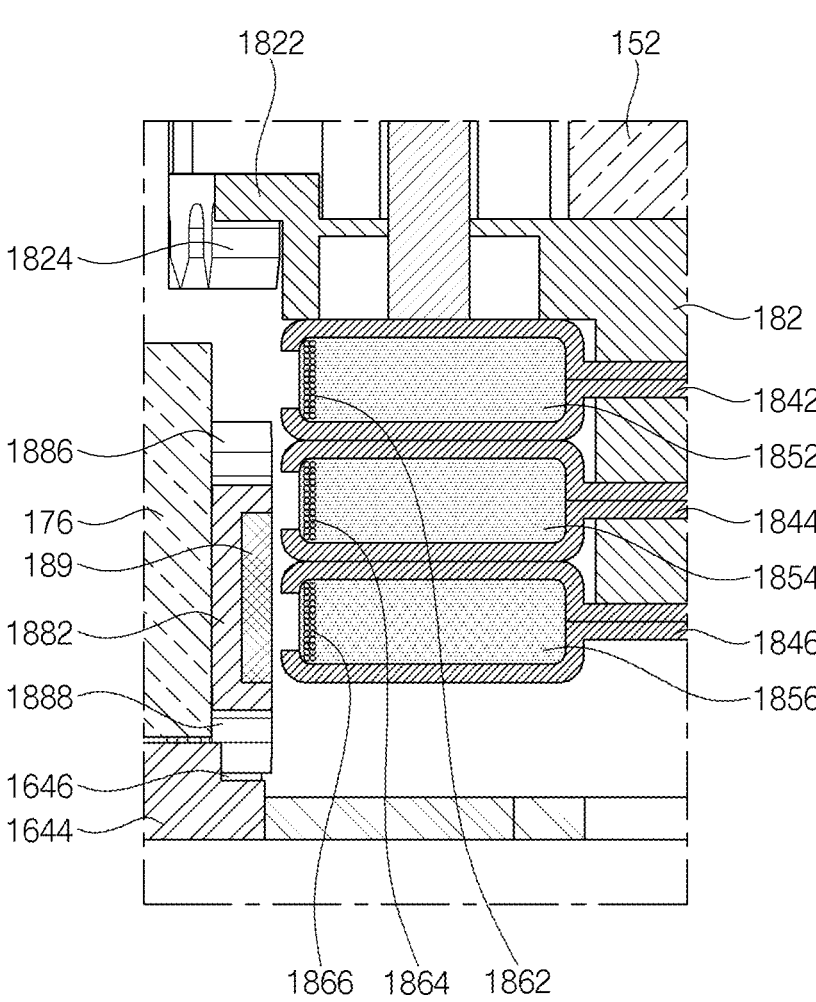

【FIG. 11】
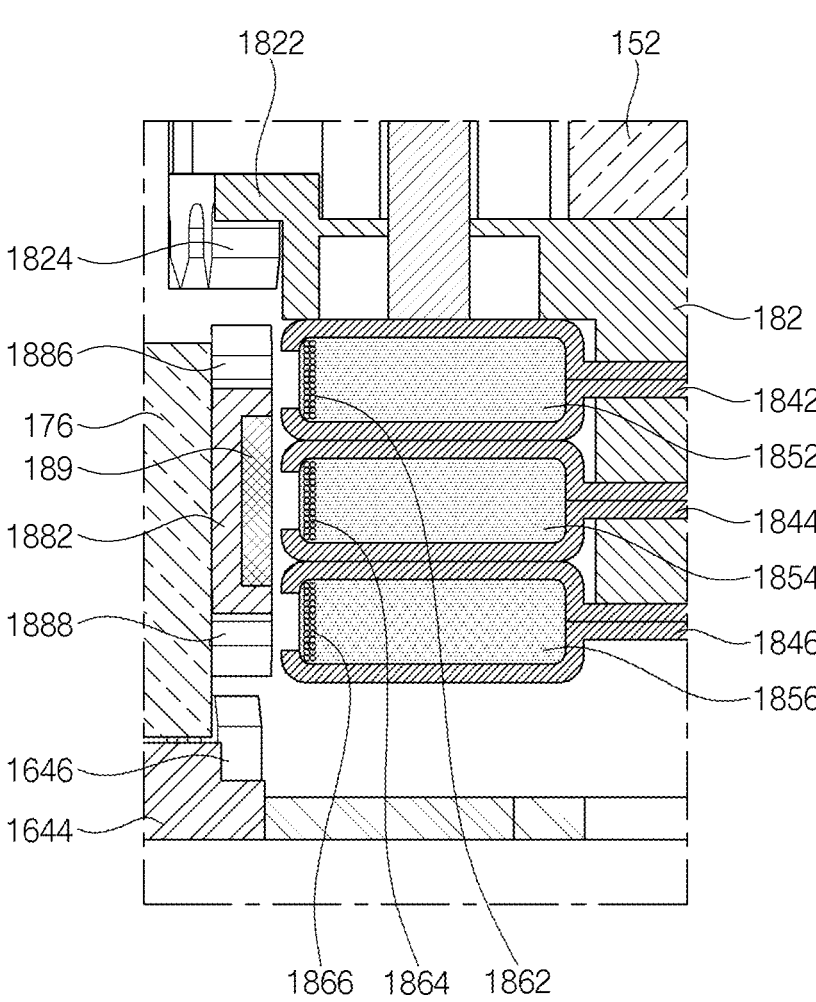

【FIG. 12】
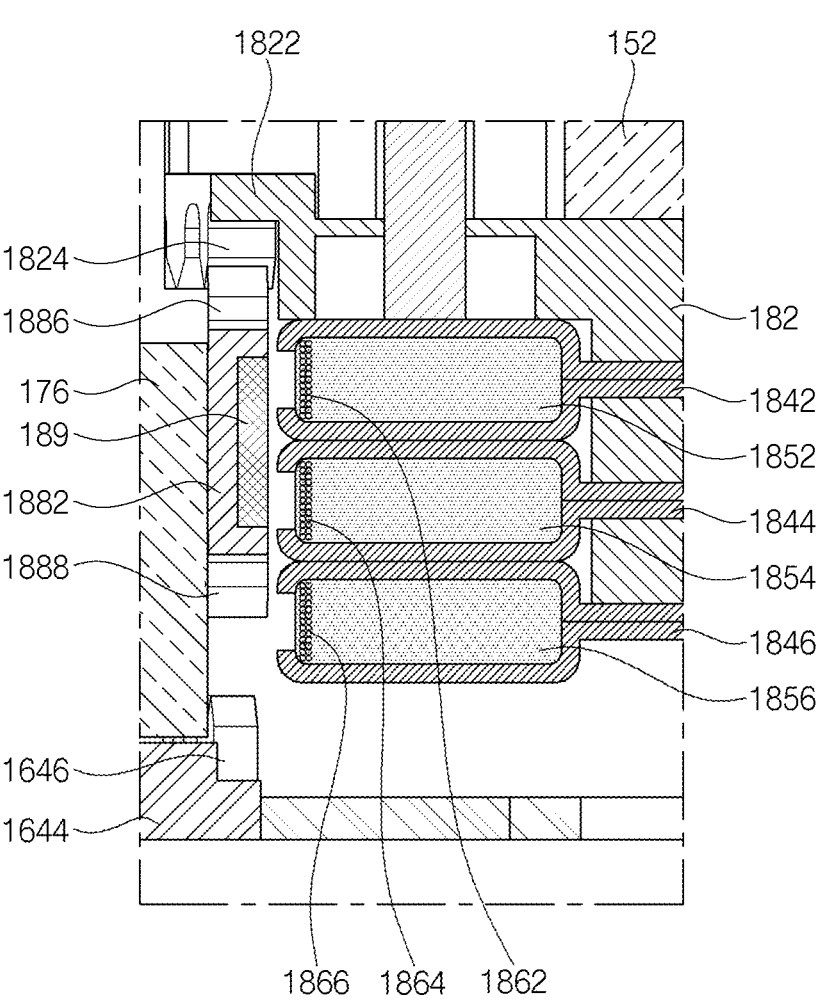

【FIG. 13】
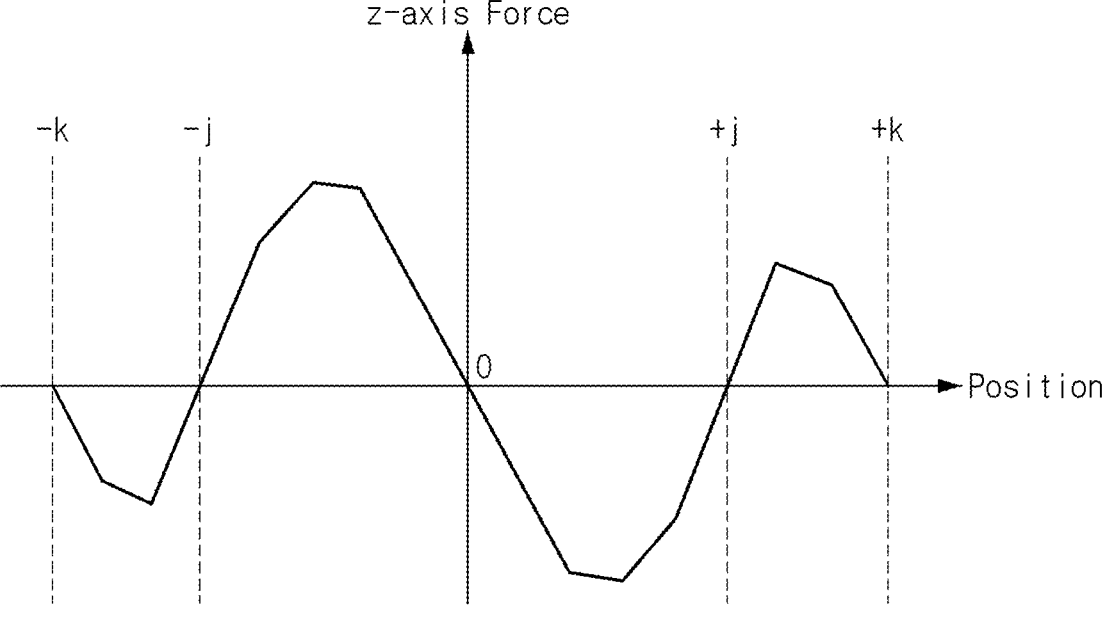
【FIG. 14】
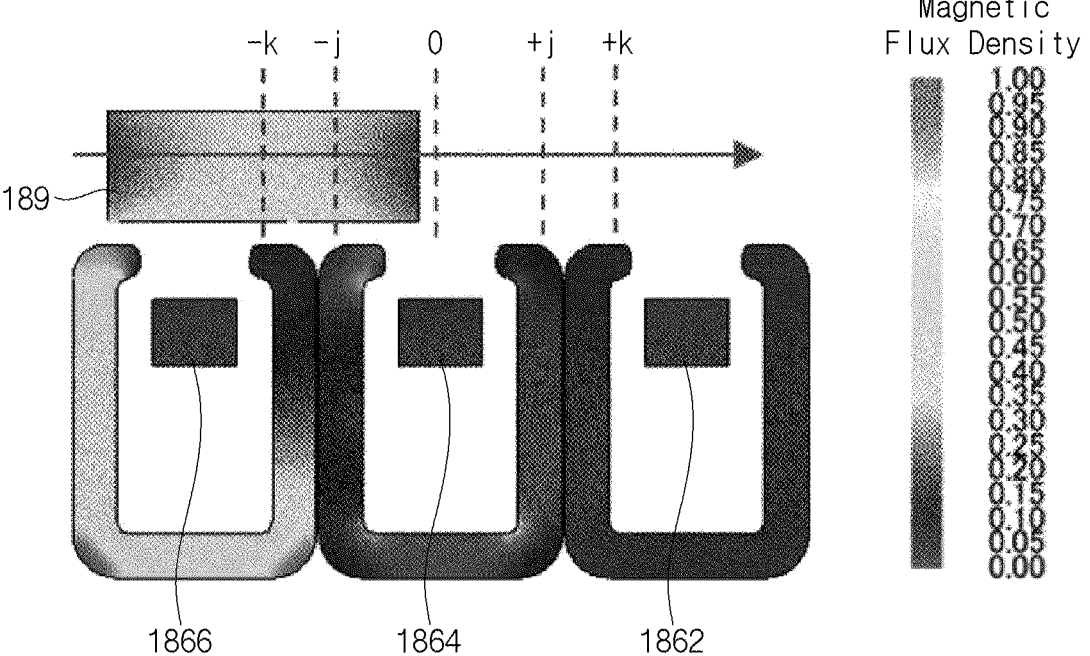
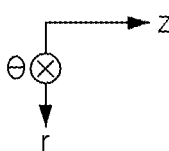

【FIG. 15】
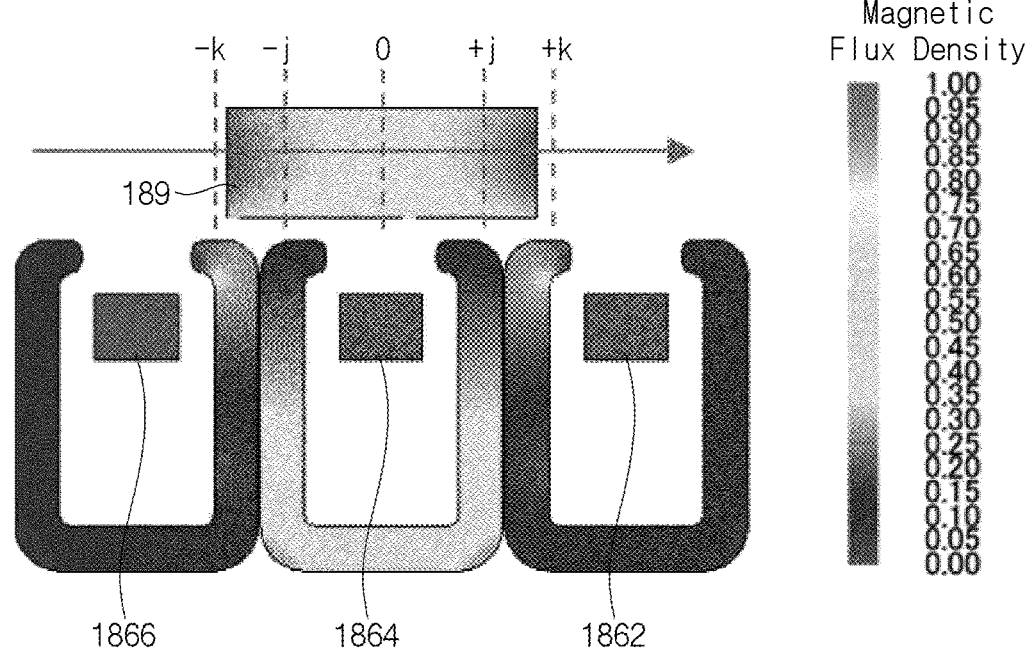
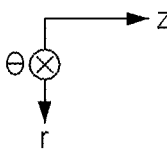

【FIG. 16】
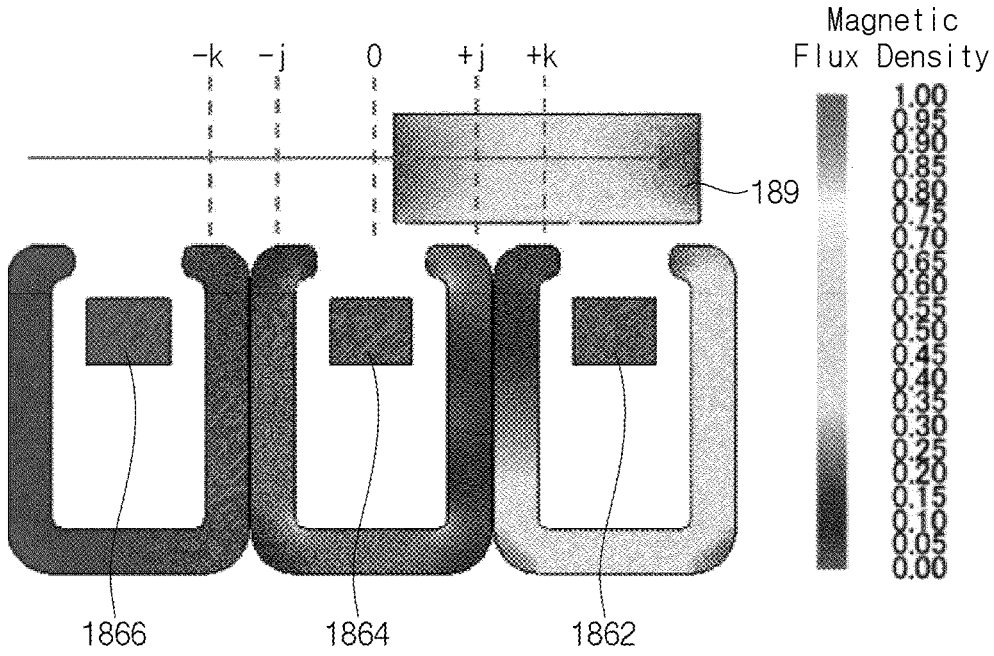
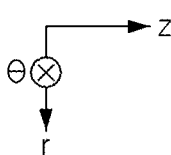

【FIG. 17】
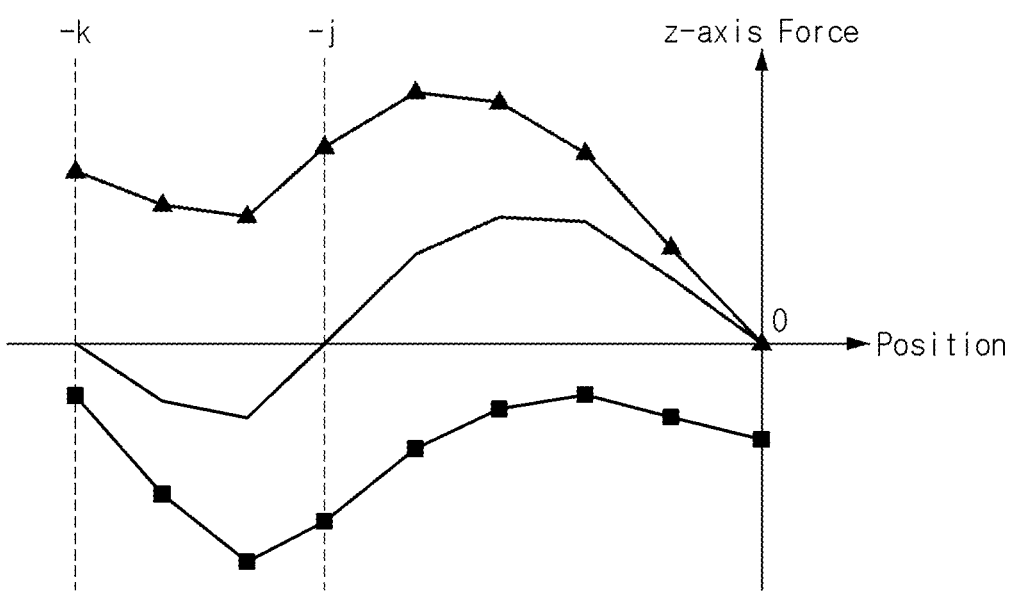

【FIG. 18】
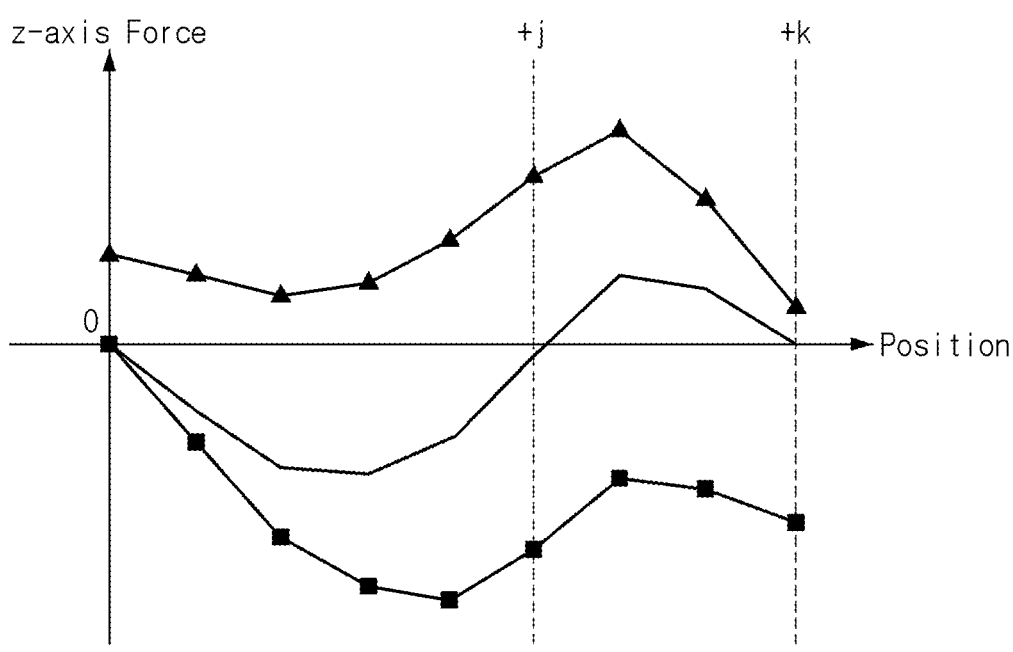

WASHING MACHINE DRIVE SYSTEM

CROSS-REFERENCE TO RELATED PATENT APPLICATIONS

This application is a U.S. National Stage Application under 35 U.S.C. § 371 of PCT Application No. PCT/KR2023/006749, filed May 18, 2023, whose entire disclosure is hereby incorporated by reference.

TECHNICAL FIELD

The present disclosure relates to a washing machine drive system, and more specifically, to a washing machine drive system having a clutch.

BACKGROUND ART

A washing machine is driven in two main operating modes (washing mode, dehydration mode) with different operating conditions.

In order to satisfy both of the above two main operating modes, the washing machine is provided with a planetary gear set and a clutch, and operates an output shaft with a low speed and high torque with a gear ratio of n:1 (washing mode), or operates the output shaft with a high speed and low torque with a gear ratio of 1:1 (dehydration mode).

Here, the output shaft refers to a shaft coupled to a drum to rotate the drum. The drum may be referred to as an "inner tub".

That is, in a typical washing machine, after a washing mode or a rinsing mode is terminated, the motor is temporarily stopped and a draining operation is performed. And, after the draining operation is completed, an initial dehydration mode starts.

However, since high torque is required to initially start wet laundry in the initial dehydration mode, the output shaft should be operated at low speed and high torque.

Moreover, in order to start the dehydration mode after the initial dehydration mode is completed, the output shaft should be operated at high speed and low torque.

Therefore, the washing machine drive system has components for changing a rotational force of a rotor shaft transmitted to the output shaft between the initial dehydration mode and the dehydration mode, such as a planetary gear set and a clutch.

As an example of a related art related to the present disclosure, Korean Patent No. KR10-1920812 (hereinafter referred to as "prior art") discloses a structure in which the position of a reduction coupling unit including a planetary gear set is moved forward and backward using a lever while changing the gear ratio.

That is, in the case of the prior art, in an initial dehydration mode, the reduction coupling unit moves forward according to the operation of a lever of a lever unit, and accordingly, the teeth formed on a coupling cap of the reduction coupling unit engage with the teeth formed on the drum, so that the washing machine operates at low speed and high torque.

In addition, in the dehydration mode, the reduction coupling unit moves backward according to the operation of the lever of the lever unit, and accordingly, the teeth formed on the coupling housing of the reduction coupling unit engage with the teeth formed on the rotor housing, so that the washing machine operates at high speed and low torque.

However, according to the drive system disclosed in the prior patent, since the pinion gear equipped on the carrier of the reduction coupling unit should move axially with respect to the sun gear, only a spur gear, not a helical gear, can be used as the pinion gear and the sun gear, which causes a problem of noise.

In addition, since the forward and backward movement of the reduction coupling unit is possible only when the motor is stopped, there is a problem that the motor should be stopped for mode switching.

In addition, the sun gear equipped in the planetary gear set is mounted on the bearing on the output shaft, and the output shaft is supported by only one bearing.

Therefore, in the initial dehydration mode, the planetary gear set acts as a support point, and the output shaft is supported by the planetary gear set and the bearing, but in the dehydration mode, the rotor, the planetary gear set, and the output shaft operate as one, and the output shaft is supported by only one bearing, so there is a problem of low durability in the dehydration mode in which the operation is performed at high speed and low torque.

DISCLOSURE

Technical Problem

An object of the present disclosure seeks to solve is to provide a washing machine drive system that can apply a reduction ratio while maintaining the rotation of a rotor by implementing a neutral mode of a clutch.

In addition, an object of the present disclosure is to provide a washing machine drive system that can generate high torque by applying a reduction ratio without stopping the rotation of the rotor.

In addition, an object of the present disclosure is to provide a washing machine drive system that can apply a helical gear to the detailed configuration of a planetary gear set.

In addition, an object of the present disclosure is to provide a washing machine drive system that can improve space efficiency while making the rotational speed of a sun gear and the rotational speed of a carrier different.

In addition, an object of the present disclosure is to provide a washing machine drive system that can improve space efficiency while making the rotational speed of a carrier and the rotational speed of a ring gear different.

In addition, an object of the present disclosure is to provide a washing machine drive system that can stop the rotation of a ring gear that is spline-coupled with the clutch actuator by coupling a clutch actuator to a clutch stator.

In addition, an object of the present disclosure is to provide a washing machine drive system that can rotate the ring gear that is spline-coupled with the clutch actuator together with the rotor by coupling the clutch actuator to the rotor.

In addition, an object of the present disclosure is to provide a washing machine drive system that can reduce power consumption by maintaining the position of the clutch actuator even when the clutch actuator is moved in a vertical direction and the supply of current is stopped.

In addition, an object of the present disclosure is to provide a washing machine drive system that can improve space efficiency and reduce size.

In addition, an object of the present disclosure is to provide a washing machine drive system that can maintain the position of the clutch actuator even when the supply of current to first to third coils is stopped by forming three stable points.

Technical Solution

According to the present disclosure, there is provided a washing machine drive system including: a housing; a motor stator coupled to the housing; a rotor facing the motor stator; an output shaft bearing-coupled to the housing; a planetary gear set coupled to the rotor and spline-coupled to an outer peripheral surface of the output shaft; a clutch stator coupled to the motor stator; and a clutch actuator spline-coupled to an outer peripheral surface of the planetary gear set so as to be vertically movable and facing the clutch stator.

In this case, the clutch stator includes first to third coils arranged in parallel in a vertical direction, the clutch actuator is fixed to the rotor and transmits rotational force of the rotor to the output shaft at a 1:1 ratio when current is supplied to the first coil, the clutch actuator is fixed to the clutch stator, reduces the rotational force of the rotor at a gear ratio of n:1, and transmits the reduced rotational force to the output shaft when current is supplied to the third coil, and the clutch actuator is disengaged from the rotor or the clutch stator when current is supplied to the second coil.

Accordingly, a neutral mode of the clutch is implemented, and thus, a reduction ratio can be applied while maintaining the rotation of the rotor.

In addition, since the reduction ratio is applied without stopping the rotation of the rotor, an initial dehydration mode can be entered, so high torque can be generated.

the planetary gear set may include a sun gear coupled to the rotor, a plurality of pinion gears coupled with an outer surface of the sun gear and spaced apart in a circumferential direction, a ring gear whose inner peripheral surface is coupled with the plurality of pinion gears and whose outer peripheral surface is spline-coupled with the clutch actuator, and a carrier coupled with the plurality of pinion gears and spline-coupled to the outer peripheral surface of the output shaft.

Accordingly, since the pinion gear does not need to move axially with respect to the sun gear, the helical gear can be applied to detailed configurations of the planetary gear set.

The washing machine drive system may further include a sun gear bearing arranged between the carrier and the sun gear.

Accordingly, space efficiency can be improved while making the rotational speed of the sun gear and the rotational speed of the carrier different.

The sun gear bearing may overlap the first and second coils in a direction perpendicular to the output shaft.

Therefore, it is possible to reduce the size of the washing machine drive system.

The washing machine drive system may further include a ring gear bearing arranged between the carrier and the ring gear.

Accordingly, space efficiency can be improved while making the rotational speed of the carrier and the rotational speed of the ring gear different.

A vertical center area of the plurality of pinion gears may be arranged between the first coil and the second coil in a direction perpendicular to the output axis.

The plurality of pinion gears may overlap the first and second coils in a direction perpendicular to the output shaft, and may not overlap the third coil in a direction perpendicular to the output shaft.

An upper surface of the ring gear may overlap the third coil in a direction perpendicular to the output shaft, and a lower surface of the ring gear may be arranged below the first coil in the direction perpendicular to the output shaft.

Therefore, it is possible to reduce the size of the washing machine drive system.

Moreover, the clutch actuator may include a first clutch portion formed on an upper surface of the clutch, the clutch stator may include a second clutch portion formed on a surface facing the upper surface of the clutch actuator, and the first clutch portion may be engaged and coupled with the second clutch portion when current is supplied to the third coil.

Therefore, by coupling the clutch actuator to the clutch stator, the rotation of the ring gear spline-coupled to the clutch actuator can be stopped.

The clutch actuator may include a third clutch portion formed on a lower surface of the clutch actuator, the rotor may include a fourth clutch portion formed on a surface facing the lower surface of the clutch actuator, and the third clutch portion may be engaged and coupled with the fourth clutch portion when current is supplied to the first coil.

Therefore, by coupling the clutch actuator to the rotor, the ring gear spline-coupled to the clutch actuator can rotate together with the rotor.

The clutch actuator may include a clutch coupling portion spline-connected to the planetary gear set and a clutch magnet disposed in the clutch coupling portion and facing the clutch stator.

In this case, the coupling of the clutch actuator and the rotor may be maintained when current is supplied to the first coil and then the supply of current is stopped, the coupling of the clutch actuator and the clutch stator may be maintained when current is supplied to the third coil and then the supply of current is stopped, and decoupling of the clutch actuator and the rotor or the clutch stator may be maintained when current is supplied to the second coil and then the supply of current is stopped.

Accordingly, power consumption can be reduced because the position of the clutch actuator is maintained even when the clutch actuator is moved in the vertical direction and the supply of current is stopped.

A vertical length of the clutch magnet may be between 1.8 and 2.2 times a vertical length of each of the first to third coils.

Moreover, the clutch stator may include a stator coupling portion coupled to the motor stator, and first to third cores arranged in the stator coupling portion and arranged in parallel in a vertical direction.

In this case, the first coil may be arranged in the first core, the second coil may be arranged in the second core, the third coil may be arranged in the third core, and the first to third cores may be each formed in the same shape, and the first to third coils may be each formed in the same shape.

The stator coupling portion may include a circumferential portion extending inwardly in the circumferential direction from an upper surface of the stator coupling portion, a second clutch portion may be arranged on a lower surface of the circumferential portion, and a second clutch portion may overlap the clutch actuator in a vertical direction.

Accordingly, it is possible to improve space efficiency of the washing machine drive system.

The clutch actuator may include a clutch coupling portion spline-coupled to the planetary gear set, and a clutch magnet disposed in the clutch coupling portion and facing the clutch stator.

In this case, the clutch magnet may overlap the first coil, the second coil, the first core, and the second core in a horizontal direction when current is supplied to the first coil, the clutch magnet may overlap the second coil and the first to third cores in the horizontal direction when current is supplied to the second coil, and the clutch magnet may overlap the second coil, the third coil, the second core, and the third core in the horizontal direction when current is supplied to the third coil.

Moreover, the vertical center region of the clutch magnet may overlap the upper region of the first coil in the horizontal direction when current is supplied to the first coil, the vertical center region of the clutch magnet may overlap the vertical center region of the second coil in the horizontal direction when current is supplied to the second coil, and the vertical center region of the clutch magnet may overlap the lower region of the third coil in the horizontal direction when current is supplied to the third coil.

Accordingly, three stable points are formed so that the position of the clutch actuator can be maintained even when the supply of current to the first to third coils is stopped.

The clutch actuator and the clutch stator may be disposed between the planetary gear set and the motor stator in a direction perpendicular to the output shaft.

The rotor may include a rotor case including a disk portion sharing a center with the output shaft and a cylindrical portion extending upward from a radially outer side of the disk portion, and a rotor magnet disposed in the cylindrical portion and facing the motor stator.

In this case, the rotor magnet may overlap the second and third coils in a direction perpendicular to the output shaft and may not overlap the first coil in the direction perpendicular to the output shaft.

Therefore, it is possible to improve of space efficiency of the rotor and the motor stator.

Advantageous Effects

According to the present disclosure, it is possible to provide a washing machine drive system that can apply a reduction ratio while maintaining the rotation of a rotor by implementing a neutral mode of a clutch.

According to the present disclosure, it is possible to provide a washing machine drive system that can generate high torque by applying a reduction ratio without stopping the rotation of the rotor.

According to the present disclosure, it is possible to provide a washing machine drive system that can apply a helical gear to the detailed configuration of a planetary gear set.

According to the present disclosure, it is possible to provide a washing machine drive system that can improve space efficiency while making the rotational speed of a sun gear and the rotational speed of a carrier different.

According to the present disclosure, it is possible to a washing machine drive system that can improve space efficiency while making the rotational speed of a carrier and the rotational speed of a ring gear different.

According to the present disclosure, it is possible to provide a washing machine drive system that can stop the rotation of a ring gear that is spline-coupled with the clutch actuator by coupling a clutch actuator to a clutch stator.

According to the present disclosure, it is possible to provide a washing machine drive system that can rotate the ring gear that is spline-coupled with the clutch actuator together with the rotor by coupling the clutch actuator to the rotor.

According to the present disclosure, it is possible to provide a washing machine drive system that can reduce power consumption by maintaining the position of the clutch actuator even when the clutch actuator is moved in a vertical direction and the supply of current is stopped.

According to the present disclosure, it is possible to provide a washing machine drive system that can improve space efficiency and reduce size.

According to the present disclosure, it is possible to provide a washing machine drive system that can maintain the position of the clutch actuator even when the supply of current to first to third coils is stopped by forming three stable points.

DESCRIPTION OF DRAWINGS

FIGS. 1 and 2 are perspective views of a tub and a washing machine drive system of a washing machine according to one embodiment of the present disclosure.

FIG. 3 is a perspective view of the washing machine drive system according to one embodiment of the present disclosure.

FIG. 4 is an exploded perspective view of the washing machine drive system according to one embodiment of the present disclosure.

FIG. 5 is a cross-sectional perspective view of the washing machine drive system according to one embodiment of the present disclosure.

FIG. 6 is a partial cross-sectional perspective view of a clutch actuator, a clutch stator, and a rotor of the washing machine drive system according to one embodiment of the present disclosure.

FIG. 7 is a view in which an upper carrier is removed in a planetary gear set of a washing machine drive system according to one embodiment of the present disclosure.

FIG. 8 is a cross-sectional view of a partial configuration of the washing machine drive system according to one embodiment of the present disclosure.

FIG. 9 is an enlarged view of the clutch actuator and the clutch stator region in a cross-section of the washing machine drive system according to one embodiment of the present disclosure.

FIGS. 10 to 12 are operation diagrams of a clutch actuator in the washing machine drive system according to one embodiment of the present disclosure.

FIG. 13 is a graph illustrating a z-axis force according to a position of the clutch actuator in the washing machine drive system according to one embodiment of the present disclosure.

FIGS. 14 to 16 are views illustrating a magnetic flux density distribution of the clutch stator according to the position of the clutch actuator in the washing machine drive system according to one embodiment of the present disclosure.

FIG. 17 and FIG. 18 are graphs illustrating the z-axis force applied to the clutch magnet according to the position of the clutch magnet of the washing machine drive system according to one embodiment of the present disclosure.

MODE FOR DISCLOSURE

Hereinafter, embodiments disclosed in this disclosure will be described in detail with reference to the attached drawings, and regardless of the drawing symbols, identical or similar components will be given the same reference numerals and redundant descriptions thereof will be omitted.

When describing the embodiments disclosed in this disclosure, when it is mentioned that a component is "coupled" or "connected" to another component, it should be understood that it may be directly connected or connected to the other component, but other components may exist therebetween.

In addition, when describing the embodiments disclosed in this disclosure, in a case where it is determined that a specific description of a related known technology may obscure the gist of the embodiments disclosed in this disclosure, the detailed description thereof will be omitted. In addition, the attached drawings are only intended to facilitate easy understanding of the embodiments disclosed in the present disclosure, and the technical ideas disclosed in the present disclosure are not limited by the attached drawings, and should be understood to include all modifications, equivalents, or substitutes included in the scope of the ideas and technologies of the present disclosure.

Meanwhile, the term such as the disclosure may be replaced with terms such as document, specification, and description.

FIG. 1 and FIG. 2 are perspective views of a tub and a washing machine drive system of a washing machine according to one embodiment of the present disclosure.

Referring to FIG. 1 and FIG. 2, the washing machine according to one embodiment of the present disclosure may include an inner tub 10, a pulsator 20, and a washing machine drive system 100, but may be implemented excluding some of the configurations thereof, and does not exclude additional configurations.

The washing machine according to one embodiment of the present disclosure may be a top loading type washing machine in which a rotation center of the inner tub 10 is formed in a direction perpendicular to a bottom and is designed to allow laundry to be loaded from the upper side, and a front loading type washing machine in which the rotation center of the inner tub 10 is formed in a direction horizontal to the bottom or inclined in a direction that decreases toward the rear end and is designed to allow laundry to be loaded from the front.

The inner tub 10 may have a cylindrical shape with an open top or front. The pulsator 20 may be arranged on a bottom surface of the inner tub 10. The inner tub 10 may be formed of a plastic material. The pulsator 20 may be connected to an output shaft 110 of the washing machine drive system 100. The washing machine drive system 100 may be coupled to the inner tub 10 to rotate the pulsator 20.

FIG. 3 is a perspective view of the washing machine drive system according to one embodiment of the present disclosure. FIG. 4 is an exploded perspective view of the washing machine drive system according to one embodiment of the present disclosure. FIG. 5 is a cross-sectional perspective view of the washing machine drive system according to one embodiment of the present disclosure. FIG. 6 is a partial cross-sectional perspective view of a clutch actuator, a clutch stator, and a rotor of the washing machine drive system according to one embodiment of the present disclosure. FIG. 7 is a view in which an upper carrier is removed in a planetary gear set of a washing machine drive system according to one embodiment of the present disclosure. FIG. 8 is a cross-sectional view of a partial configuration of the washing machine drive system according to one embodiment of the present disclosure. FIG. 9 is an enlarged view of the clutch actuator and the clutch stator region in a cross-section of the washing machine drive system according to one embodiment of the present disclosure.

Referring to FIGS. 3 to 9, the washing machine drive system 100 according to one embodiment of the present disclosure may include an output shaft 110, a housing 120, a first bearing 130, a second bearing 140, a motor stator 150, a rotor 160, a planetary gear set 170, and a clutch 180, but some of these components may be excluded and additional components are not excluded.

The output shaft 110 may be extended in an axial direction. The output shaft 110 may be coupled with the pulsator 20. The output shaft 110 may be rotatably coupled to the housing 120. The output shaft 110 may be bearing-coupled to the housing 120. The output shaft 110 may be coupled to the planetary gear set 170. The output shaft 110 may be spline-coupled to the carrier 179 of the planetary gear set 170. Here, the spline refers to a groove or a groove cut into a shaft or a bore, and the spline-coupling may refer to a coupling that can rotate together while sliding in the axial direction. The output shaft 110 may rotate at the same speed as the carrier 179 of the planetary gear set 170. In one embodiment of the present disclosure, the axial direction may be interpreted as a vertical direction based on FIGS. 4 and 5.

The pulsator 20 may be coupled to the upper region of the output shaft 110. The central region of the output shaft 110 may be bearing-coupled to the housing 120. A first bearing 130 and a second bearing 140 may be arranged between the central region of the output shaft 110 and the housing 120.

The lower region of the output shaft 110 may be arranged inside the rotor 160. The lower region of the output shaft 110 may be coupled to the planetary gear set 170. The diameter of the lower region of the output shaft 110 may be smaller than the diameter of the central region. The axial length of the lower region of the output shaft 110 may be shorter than the axial length of the central region of the output shaft 110.

The output shaft 110 may include a first spline portion 112 formed on an outer peripheral surface. The first spline portion 112 may protrude outwardly from the outer peripheral surface of the output shaft 110. The first spline portion 112 may be arranged in a lower region of the output shaft 110. The first spline portion 112 may be spline-coupled to the second spline portion 1792 of the carrier 179 of the planetary gear set 170.

The output shaft 110 may be rotatably coupled to the housing 120. The pulsator 20 may be arranged in the upper portion of the housing 120. The housing 120 may be coupled to the inner tub 10. The motor stator 150, the rotor 160, the planetary gear set 170, and the clutch 180 may be arranged in the lower portion of the housing 120. The housing 120 may be coupled to the motor stator 150. The housing 120 may be formed of a plastic material.

The first bearing 130 may be arranged between the output shaft 110 and the housing 120. The first bearing 130 may bearing-couple the output shaft 110 to the housing 120. The first bearing 130 may rotatably couple the output shaft 110 to the housing 120. The first bearing 130 may extend in the circumferential direction. The first bearing 130 may be arranged above the second bearing 140.

The second bearing 140 may be arranged between the output shaft 110 and the housing 120. The second bearing 140 may bearing-couple the output shaft 110 to the housing 120. The second bearing 140 may rotatably couple the output shaft 110 to the housing 120. The second bearing 140 may extend in the circumferential direction. The second bearing 140 may be arranged below the first bearing 130. The second bearing 140 may be arranged above the planetary gear set 170. The second bearing 140 may be arranged above the carrier 179 of the planetary gear set 170. The second bearing 140 may be arranged radially inwardly of the motor stator 150. The second bearing 140 may be arranged radially inwardly of the clutch stators 182, 184, 185, and 186.

The motor stator 150 may be coupled to the housing 120. The motor stator 150 may be arranged inside the rotor 160. The motor stator 150 may face the rotor 160. The motor stator 150 may be arranged above the clutch 180. The motor stator 150 may be arranged above the clutch stators 182, 184, 185, and 186. The clutch stators 182, 184, 185, and 186 may be coupled to the motor stator 150.

The motor stator 150 may include a motor coupling portion 152. The motor coupling portion 152 may be coupled to the housing 120. The motor coupling portion 152 may be arranged below the housing 120. A stator coupling portion 182 may be coupled to the motor couple portion 152. The motor couple portion 152 may be arranged above the stator coupling portion 182. The motor couple portion 152 may extend in a circumferential direction. A motor stator 154 may be arranged on an outer peripheral surface of the motor couple portion 152.

The motor stator 150 may include the motor stator 154. The motor stator 154 may be disposed radially outwardly of the motor couple portion 152. The motor stator 154 may be coupled to the motor couple portion 152. The motor stator 154 may be disposed radially inwardly of the rotor 160. The motor stator 154 may face the rotor magnet 162. The motor stator 154 may include a plurality of motor stator units spaced apart in the circumferential direction. The motor stator unit may include a motor stator core formed on an outer peripheral surface of the motor couple portion 152, a motor coil wound around the motor stator core, and a yoke coupled to the motor stator core. The motor stator 154 may rotate the rotor magnet 162 through electromagnetic interaction.

The rotor 160 may face the motor stator 150. The rotor 160 may be coupled with the planetary gear set 170. The rotor 160 may be coupled with a sun gear 172 of the planetary gear set 170. Therefore, the rotor 160 may supply a rotational force to the output shaft 110.

The rotor 160 may include a rotor magnet 162. The rotor magnet 162 may be disposed in a rotor case 164. The rotor magnet 162 may be disposed on an inner peripheral surface of a cylindrical portion 1642 of the rotor case 164. The rotor magnet 162 may face the motor stator 150. The rotor magnet 162 may face the motor stator 154 of the motor stator 150. When current is supplied to the motor stator 154 of the motor stator 150, the rotor magnet 162 may rotate in one direction or the other direction due to electromagnetic interaction.

The rotor magnet 162 may overlap a second coil 1864 and a third coil 1862 in a direction perpendicular to or horizontal to the output shaft 110. The rotor magnet 162 may not overlap the first coil 1866 in the direction perpendicular to or horizontal to the output shaft 110. Accordingly, the space efficiency of the rotor 160 and the motor stator 150 can be improved.

The rotor magnet 162 may include a plurality of rotor magnet units spaced apart in the circumferential direction. Each of the plurality of rotor magnet units may face each of the plurality of motor stator units.

The rotor 160 may include a rotor case 164. The rotor case 164 may include a disk portion 1644 sharing a center with the output shaft 110 and a cylindrical portion 1642 extending upwardly from the radial outer side of the disk portion 1644. A rotor magnet 162 may be arranged on an inner peripheral surface of a cylindrical portion 1642. A disk portion 1644 may be coupled with the planetary gear set 170. The disk portion 1644 may be coupled with the sun gear 172 of the planetary gear set 170. A fourth clutch portion 1646 may be formed in the disk portion 1644. The fourth clutch portion 1646 may be formed on an upper surface of the disk portion 1644. The fourth clutch portion 1646 may face a third clutch portion 1888 of clutch actuators 188 and 189. The fourth clutch portion 1646 may be engaged and coupled with the third clutch portion 1888 of the clutch actuators 188 and 189. The fourth clutch portion 1646 may extend in the circumferential direction. The fourth clutch portion 1646 may be formed of a plurality of protrusions spaced apart from each other in the circumferential direction.

The motor stator 150 and the rotor 160 may be referred to as a "motor".

The planetary gear set 170 may be spline-coupled to the outer peripheral surface of the output shaft 110. The planetary gear set 170 may be coupled to the rotor 160. The planetary gear set 170 may rotate integrally with the rotor 160. The planetary gear set 170 may transmit the rotational force of the rotor 160 to the output shaft 110.

Specifically, according to the vertical movement of the clutch actuators 188 and 189, the planetary gear set 170 may transmit the rotational force of the rotor 160 to the output shaft 110 by reducing the rotational force with a gear ratio of 1:1 or n:1. For example, when the clutch actuators 188 and 189 moves upward and is fixed to the clutch stators 182, 184, 185, and 186, a part of the planetary gear set 170 spline-coupled with the clutch actuators 188 and 189 is fixed, so that the rotational force of the rotor 160 may be transmitted to the output shaft 110 while being reduced with a gear ratio of n:1. In contrast, when the clutch actuators 188 and 189 moves downward and is fixed to the rotor 160, the clutch actuators 188 and 189 and the planetary gear set 170 rotate together with the rotor 160 as a whole, so that the rotational force of the rotor 160 may be transmitted to the output shaft 110 in a 1:1 ratio. Accordingly, a washing mode and a dehydration mode may be implemented without a stop motion between the end of the washing and the start of the dehydration.

The planetary gear set 170 may include a sun gear 172, a plurality of pinion gears 174, a ring gear 176, a connecting portion 178, and a carrier 179.

The sun gear 172 may be coupled to the rotor 160. The sun gear 172 may be coupled to the rotor case 164 of the rotor 160. The lower region of the sun gear 172 may be coupled to the radially inner region of the rotor case 164. The sun gear 172 may be coupled to the plurality of pinion gears 174. The upper region of the sun gear 172 may be coupled to the plurality of pinion gears 174. The outer peripheral surface of the sun gear 172 may be coupled to the plurality of pinion gears 174. The sun gear 172 may be bearing-coupled to the carrier 179 through a sun gear bearing 173. A first gear 1722 may be formed on the outer peripheral surface of the sun gear 172. In one embodiment of the present disclosure, the first gear 1722 is described as a spur gear, but the first gear 1722 may be changed to a helical gear.

The plurality of pinion gears 174 may be spaced apart from each other in the circumferential direction. The outer peripheral surfaces of the plurality of pinion gears 174 may be coupled with the outer peripheral surfaces of the sun gear 172, respectively. A second gear 1742 may be formed on the outer peripheral surfaces of the plurality of pinion gears 174. In one embodiment of the present disclosure, the second gear 1742 is described as a spur gear, but alternatively, the second gear 1742 may be changed to a helical gear.

In one embodiment of the present disclosure, the number of the plurality of pinion gears 174 is described as three, but is not limited thereto, and the number of the plurality of pinion gears 174 may be changed in various ways.

The connecting portion 178 may be formed inside each of the plurality of pinion gears 174. The plurality of pinion gears 174 may be connected to the carrier 179 through the connecting portion 178.

An inner peripheral surface of the ring gear 176 may be coupled with the plurality of pinion gears 174. A third gear 1762 may be formed on the inner peripheral surface of the ring gear 176. In one embodiment of the present disclosure, the third gear 1762 is described as a spur gear, but in other embodiments, the third gear 1762 may be changed to a helical gear.

The outer peripheral surface of the ring gear 176 may be spline-coupled with the clutch actuators 188 and 189. A third spline portion 1764 may be formed on the outer peripheral surface of the ring gear 176. The third spline portion 1764 of the ring gear 176 may be spline-coupled with a fourth spline portion 1884 of the clutch actuators 188 and 189.

The carrier 179 may be coupled with the plurality of pinion gears 174. The carrier 179 may be coupled with the plurality of pinion gears 174 through the connecting portion 178. The carrier 179 may be arranged on the plurality of pinion gears 174.

The carrier 179 may be spline-coupled to the outer peripheral surface of the output shaft 110. A second spline portion 1792 may be formed on the inner peripheral surface of the carrier 179. The second spline portion 1792 may be spline-coupled with the first spline portion 112 of the output shaft 110.

The carrier 179 may be bearing-coupled with the sun gear 172 through the sun gear bearing 173. The carrier 179 may be bearing-coupled with the ring gear 176 through the ring gear bearing 177. Therefore, the rotational speed of the carrier 179 and the rotational speed of the ring gear 176 may be made different, and the rotational speed of the carrier 179 and the rotational speed of the sun gear 172 may be made different, so that the rotational force of the rotor 160 may be reduced by the gear ratio of n:1 and transmitted to the output shaft 110.

The ring gear bearing 177 may include a first ring gear bearing 1772 and a second ring gear bearing 1774 that are spaced apart in the vertical direction. The first ring gear bearing 1772 may be arranged above the plurality of pinion gears 174, and the second ring gear bearing 1774 may be arranged below the plurality of pinion gears 174.

The sun gear bearing 173 may overlap the first coil 1866 and the second coil 1864 in the direction vertical or horizontal to the output shaft 110. The sun gear bearing 173 may include a first sun gear bearing 1732 and a second sun gear bearing 1734 that are spaced apart in a vertical direction. The vertical center regions of the plurality of pinion gears 174 may be arranged between the first coil 1866 and the second coil 1864 in a direction vertical or horizontal to the output shaft 110. The plurality of pinion gears 174 may overlap the first coil 1866 and the second coil 1864 in the direction perpendicular or horizontal to the output shaft 110. The plurality of pinion gears 174 may not overlap the third coil 1862 in the direction perpendicular or horizontal to the output shaft 110. The upper surface of the ring gear 176 may overlap the third coil 1862 in the direction perpendicular or horizontal to the output shaft 110. The lower surface of the ring gear 176 may be arranged below the first coil 1866 in a direction perpendicular or horizontal to the output shaft 110. Therefore, the size of the washing machine drive system 100 can be reduced.

The clutch 180 may be arranged between the motor 150 and 160 and the planetary gear set 170. A portion of the clutch 180 may be spline-coupled to the planetary gear set 170, and another portion may be coupled to the motor stator 150. The clutch 180 may lock or unlock a portion of the planetary gear set 170. Accordingly, the clutch 180 may allow the planetary gear set 170 to transmit the rotational force of the rotor 160 to the output shaft 110 at a 1:1 ratio, or to transmit the rotational force to the output shaft 110 while reducing the rotation force at a gear ratio of n:1. The clutch 180 may include the clutch stators 182, 184, 185, and 186 and clutch actuators 188 and 189.

The clutch stators 182, 184, 185, and 186 may be coupled to the motor stator 150. The clutch stators 182, 184, 185, and 186 may be coupled to the motor couple portion 152. The clutch stators 182, 184, 185, and 186 may be coupled to the lower surface of the motor couple portion 152. The clutch stators 182, 184, 185, and 186 may be arranged between the planetary gear set 170 and the motor stator 150 in the direction perpendicular or horizontal to the output shaft 110. The clutch stators 182, 184, 185, and 186 may include a stator coupling portion 182, a clutch stator 184, an insulator 185, and a coil 186.

The stator coupling portion 182 may be coupled to the lower surface of the motor couple portion 152. The clutch stator 184, the insulator 185, and the coil 186 may be coupled to the stator coupling portion 182. The stator coupling portion 182 may be formed of a plastic material. The stator coupling portion 182 may include a circumferential portion 1822 extending inwardly in a circumferential direction from an upper surface, and a second clutch portion 1824 formed on a lower surface of the circumferential portion 1822.

The circumferential portion 1822 may extend in a circumferential direction. The circumferential portion 1822 may extend upwardly from the upper surface and inner peripheral surface of the stator coupling portion 182 and extend radially inwardly. The lower surface of the circumferential portion 1822 may face the clutch actuators 188 and 189.

The second clutch portion 1824 may be vertically overlapped with the clutch actuators 188 and 189. The second clutch portion 1824 may face a first clutch portion 1886 of the clutch actuators 188 and 189. The second clutch portion 1824 may be engaged and coupled with the first clutch portion 1886 of the clutch actuators 188 and 189. The second clutch portion 1824 may be formed with a plurality of protrusions spaced apart from each other in the circumferential direction.

The clutch stator 184 may be coupled to the stator coupling portion 182. The clutch stator 184 may be formed of a metal material. The insulator 185 and a coil 186 may be arranged in the clutch stator 184. The clutch stator 184 may include first to third cores 1842, 1844, and 1846 arranged in parallel in the vertical direction. The first to third cores 1842, 1844, and 1846 may be formed in the same shape, respectively. First to third insulators 1852, 1854, and 1856 and the first to third coils 1862, 1864, and 1866 may be arranged in the first to third cores 1842, 1844, and 1846.

The insulator 185 may be arranged in the clutch stator 184. The insulator 185 may include first to third insulators 1852, 1854, and 1856 arranged in parallel in the vertical direction. The first to third insulators 1852, 1854, and 1856 may be arranged in the first to third cores 1842, 1844, and 1846.

The coil 186 may be arranged in the clutch stator 184. The coil 186 may be arranged radially inwardly of the insulator 185. The coil 186 may include the first to third coils 1862, 1864, and 1866. The first to third coils 1862, 1864, and 1866 may be arranged in parallel in the vertical direction. The first to third coils 1862, 1864, and 1866 may be spaced apart from each other at equal intervals in the vertical direction. The first coil 1866 may be arranged in the first core 1846. The second coil 1864 may be arranged in the second core 1844. The third coil 1862 may be arranged in the third core 1846. The first to third coils 1862, 1864, and 1866 may each be formed in the same shape.

When current is supplied to the first coil 1866, the clutch actuators 188 and 189 may move downward. In this case, the third clutch portion 1888 of the clutch actuators 188 and 189 is engaged and coupled with the fourth clutch portion 1646 of the rotor 160 so that the clutch actuators 188 and 189 may be fixed to the rotor 160. Since the planetary gear set 170 spline-coupled with the clutch actuators 188 and 189 rotates integrally with the rotor 160, the rotational force of the rotor 160 may be transmitted 1:1 to the output shaft 110 to implement the dehydration mode.

When current is supplied to the third coil 1862, the clutch actuators 188 and 189 may move upward. In this case, the first clutch portion 1886 of the clutch actuators 188 and 189 is engaged and coupled with the second clutch portion 1824 of the clutch stators 182, 184, 185, and 186 so that the clutch actuators 188 and 189 may be fixed to the clutch stators 182, 184, 185, and 186. Since the ring gear 176 of the planetary gear set 170 spline-coupled to the clutch actuators 188 and 189 is fixed, the rotational force of the rotor 160 may be reduced by a gear ratio of n:1 and transmitted to the output shaft 110 to implement the washing mode.

When current is supplied to the second coil 1864, the clutch actuators 188 and 189 may be decoupled from the rotor 160 or the clutch stators 182, 184, 185, and 186. Accordingly, the neutral mode of the clutch 180 is implemented, so that the reduction ratio may be applied while maintaining the rotation of the rotor 160. In addition, since the rotation of the rotor 160 is not stopped and the reduction ratio is applied to enter the initial dehydration mode, high torque may be generated.

The clutch actuators 188 and 189 may be spline-coupled to the outer peripheral surface of the planetary gear set 170. Accordingly, the clutch actuators 188 and 189 may move in the vertical direction in a state of being coupled to the planetary gear set 170. The clutch actuators 188 and 189 may face the clutch stators 182, 184, 185, and 186. The clutch actuators 188 and 189 may be arranged between the planetary gear set 170 and the motor stator 150 in the direction perpendicular or horizontal to the output shaft 110. The clutch actuators 188 and 189 may include a clutch coupling portion 1882, a first clutch portion 1886, a third clutch portion 1888, a fourth spline portion 1884, and a clutch magnet 189.

The clutch coupling portion 1882 may extend in the circumferential direction. The cross section of the clutch coupling portion 1882 may be formed in a "U" shape. The clutch coupling portion 1882 may be spline-coupled to the planetary gear set 170. The clutch coupling portion 1882 may be spline-coupled to the ring gear 176 of the planetary gear set 170. The clutch coupling portion 1882 may face the clutch stators 182, 184, 185, and 186. The upper surface of the clutch coupling portion 1882 may face the second clutch portion 1824. The lower surface of the clutch coupling portion 1882 may face the fourth clutch portion 1646.

The first clutch portion 1886 may be formed on the upper surface of the clutch actuators 188 and 189. The first clutch portion 1886 may be formed on the upper surface of the clutch coupling portion 1882. The first clutch portion 1886 may be formed in a plurality of protrusion shapes spaced apart in the circumferential direction. The first clutch portion 1886 may face the second clutch portion 1824. The first clutch portion 1886 may be engaged and coupled with the second clutch portion 1824. Specifically, when current is supplied to the third coil 1862 and the clutch actuators 188 and 189 moves upward, the first clutch portion 1886 may be engaged and coupled with the second clutch portion 1824 so that the clutch actuators 188 and 189 may be fixed to the clutch stators 182, 184, 185, and 186. Accordingly, by coupling the clutch actuators 188 and 189 to the clutch stators 182, 184, 185, and 186, the rotation of the ring gear 176 spline-coupled with the clutch actuators 188 and 189 may be stopped.

The third clutch portion 1888 may be formed on the lower surface of the clutch actuators 188 and 189. The third clutch portion 1888 may be formed on the lower surface of the clutch coupling portion 1882. The third clutch portion 188 may be formed as a plurality of protrusion shapes spaced apart in the circumferential direction. The third clutch portion 1888 may face the fourth clutch portion 1646. The third clutch portion 1888 may be engaged and coupled with the fourth clutch portion 1646. Specifically, when current is supplied to the first coil 1866 and the clutch actuators 188 and 189 moves downward, the third clutch portion 1888 may be engaged and coupled with the fourth clutch portion 1646, so that the clutch actuators 188 and 189 may be fixed to the rotor 160. Therefore, the ring gear 176 spline-coupled with the clutch actuators 188 and 189 may be rotated together with the rotor 160.

The fourth spline portion 1884 may be formed on the inner peripheral surface of the clutch coupling portion 1882. The fourth spline portion 1884 may be spline-coupled with the planetary gear set 170. The fourth spline portion 1884 may be spline-coupled with the third spline portion 1764 of the ring gear 176.

The clutch magnet 189 may be arranged in the clutch coupling portion 1882. The clutch magnet 189 may be arranged in a groove formed on the outer peripheral surface of the clutch coupling portion 1882. The clutch magnet 189 may extend in the circumferential direction. The clutch magnet 189 may face the clutch stators 182, 184, 185, and 186. The clutch magnet 189 may face the first to third coils 1862, 1864, and 1866. The clutch magnet 189 may move in the vertical direction by electromagnetic interaction with the first to third coils 1862, 1864, and 1866. The clutch magnet 189 may include a plurality of magnetic poles arranged in the vertical direction. The vertical length of the clutch magnet 189 may be between 1.5 and 2.5 times the vertical length of each of the first to third coils 1862, 1864, and 1866. Preferably, the vertical length of the clutch magnet 189 may be between 1.8 and 2.2 times the vertical length of each of the first to third coils 1862, 1864, and 1866. More preferably, the vertical length of the clutch magnet 189 may be twice the vertical length of each of the first to third coils 1862, 1864, and 1866. Accordingly, while the positions of the three stable points can be stably determined, the efficiency of the clutch 180 can be improved. Here, the vertical length of the clutch magnet 189 may be understood to mean the length in the up-down direction based on FIGS. 5, 6, 8 to 12.

When current is supplied to the first coil 1866, the clutch magnet 189 may overlap the first coil 1866, the second coil 1864, the first core 1846, and the second core 1844 in the horizontal direction. When current is supplied to the first coil 1866, the vertical center region of the clutch magnet 189 may be overlap the upper region of the first coil 1866 in the horizontal direction. Here, the upper region of the first coil 1866 may be interpreted as meaning a region adjacent to the upper end or the upper surface of the first coil 1866. In the present disclosure, the meaning of overlapping in the horizontal direction may be understood as overlapping in a left-right direction based on FIGS. 5, 6, 8 to 12.

When current is supplied to the second coil 1864, the clutch magnet 189 may overlap the second coil 1864 and the first to third cores 1842, 1844, and 1846 in the horizontal direction. When current is supplied to the second coil 1864, the vertical center region of the clutch magnet 189 may overlap the vertical center region of the second coil 1864 in the horizontal direction.

When current is supplied to the third coil 1862, the clutch magnet 189 may overlap the second coil 1864, the third coil 1862, the second core 1844, and the third core 1842 in the horizontal direction. When current is supplied to the third coil 1862, the vertical center region of the clutch magnet 189 may overlap the lower region of the third coil 1862 in the horizontal direction. Here, the lower region of the third coil 1862 may be interpreted as a region adjacent to the lower end or the lower surface of the third coil 1862.

Accordingly, three stable points may be formed so that the position of the clutch actuators 188 and 189 may be maintained even when the supply of current to the first to third coils 1862, 1864, and 1866 is stopped. Here, the three stable points may be understood as the central region of the clutch magnet 189 being located at the –k, 0, and k points based on FIGS. 13 to 15.

Specifically, when the supply of current is stopped after the supply of current to the first coil 1866, the coupling of the clutch actuators 188 and 189 and the rotor 160 may be maintained. When the current supply to the third coil 1862 is stopped after the current supply is supplied, the coupling between the clutch actuators 188 and 189 and the clutch stators 182, 184, 185, and 186 may be maintained. When the current supply to the second coil 1864 is stopped after the current supply is supplied, the decoupling between the clutch actuators 188 and 189 and the rotor 160 or the clutch stators 182, 184, 185, and 186 may be maintained.

Accordingly, even when the clutch actuators 188 and 189 is moved in the vertical direction and the current supply is stopped, the position of the clutch actuators 188 and 189 is maintained, so that power consumption may be reduced.

FIGS. 10 to 12 are operation diagrams of the clutch actuator in the washing machine drive system according to one embodiment of the present disclosure.

Referring to FIG. 10, when current is supplied to the first coil 1866, the clutch actuators 188 and 189 moves downward due to the electromagnetic interaction between the first coil 1866 and the clutch magnet 189. In this case, the third clutch portion 1888 of the clutch actuators 188 and 189 is engaged and coupled with the fourth clutch portion 1646 of the rotor 160. Since the ring gear 174 spline-coupled with the clutch actuators 188 and 189 rotate together with the rotor 160, the clutch 180 transmits the rotational force of the rotor 160 to the output shaft 110 1:1 to implement the dehydration mode.

Referring to FIG. 11, when current is supplied to the second coil 1864, the clutch actuators 188 and 189 moves to the region adjacent to the second coil 1864 due to the electromagnetic interaction between the second coil 1864 and the clutch magnet 189. In this case, the clutch actuators 188 and 189 are decoupled with the rotor 160 and the clutch stators 182, 184, 185, and 186 and implements the neutral mode, so that even when the rotor 160 rotates, the mode can be switched from the washing mode to the dehydration mode or from the dehydration mode to the washing mode.

Referring to FIG. 12, when current is supplied to the third coil 1862, the clutch actuators 188 and 189 moves upward due to the electromagnetic interaction between the third coil 1862 and the clutch magnet 189. In this case, the first clutch portion 1886 of the clutch actuators 188 and 189 is engaged and coupled with the second clutch portion 1824 of the clutch stators 182, 184, 185, and 186. Since the ring gear 174 splined-coupled with the clutch actuators 188 and 189 is fixed, the planetary gear set 170 reduces the rotational force of the rotor 160 with a gear ratio of n:1 and transmits the reduced rotational force to the output shaft 110 to implement the washing mode.

FIG. 13 is a graph illustrating a z-axis force according to the position of the clutch actuator of the washing machine drive system according to one embodiment of the present disclosure. FIGS. 14 to 16 are views illustrating a magnetic flux density distribution of the clutch stator according to the position of the clutch actuator of the washing machine drive system according to one embodiment of the present disclosure.

Referring to FIGS. 13 and 14, it can be seen that when the vertical center region of the clutch magnet 189 is arranged at a –k position, the z-axis force applied to the clutch magnet 189 by the magnetic flux density of the first to third cores 1842, 1844, and 1846 and the clutch magnet 189 is 0.

Referring to FIGS. 13 and 15, it can be seen that when the vertical center region of the clutch magnet 189 is arranged at an O position, the z-axis force applied to the clutch magnet 189 by the magnetic flux density of the first to third cores 1842, 1844, and 1846 and the clutch magnet 189 is 0.

Referring to FIG. 13 and FIG. 16, when the vertical center region of the clutch magnet 189 is arranged at a +k position, it can be seen that the z-axis force applied to the clutch magnet 189 by the magnetic flux density of the first to third cores 1842, 1844, and 1846 and the clutch magnet 189 is 0.

FIG. 17 and FIG. 18 are graphs illustrating the z-axis force applied to the clutch magnet according to the position of the clutch magnet of the washing machine drive system according to one embodiment of the present disclosure.

Referring to FIGS. 14 and 17, when the mode is switched from Mode 1 to Mode 2, current is supplied to the second coil 1864. Specifically, when current is supplied to the second coil 1864 in the dehydration mode where the clutch magnet 189 is on the left side in the z-axis direction vertically downward, force is applied to the clutch magnet 189 to the right side in the z-axis direction. In this case, since the position of the clutch magnet 189 moves to the center in the z-axis direction (center in the vertical direction), the neutral mode can be implemented. In particular, when the position of the z-axis center area (center area in the vertical direction) of the clutch magnet 189 is at a position of 0, the z-axis force applied to the clutch magnet 189 becomes 0, so that it can be positioned at a stable point without immediately switching to the washing mode.

Referring to FIGS. 15 and 17, when the mode is switched from Mode 2 to Mode 1, current is supplied to the first coil 1866. Specifically, when current is supplied to the first coil 1866 in the neutral mode where the clutch magnet 189 is at the center of the z-axis direction (center in the vertical direction), a force is applied to the clutch magnet 189 to the left in the z-axis direction. In this case, since the position of the clutch magnet 189 moves to the left in the z-axis direction (downward in the vertical direction), the dehydration mode can be implemented.

Referring to FIG. 15 and FIG. 18, when the mode is switched from Mode 2 to Mode 3, current is supplied to the third coil 1862. Specifically, when current is supplied to the third coil 1862 in the neutral mode where the clutch magnet 189 is at the center of the z-axis direction (the center in the vertical direction), a force is applied to the clutch magnet 189 to the right in the z-axis direction. In this case, since the position of the clutch magnet 189 moves to the right in the z-axis direction (upward in the vertical direction), the washing mode can be implemented.

Referring to FIG. 16 and FIG. 18, when the mode is switched Mode 3 to Mode 2, current is supplied to the second coil 1864. Specifically, when current is supplied to the second coil 1864 in the washing mode where the clutch magnet 189 is to the right in the z-axis direction (upward in the vertical direction), a force is applied to the clutch magnet 189 to the left in the z-axis direction. In this case, since the position of the clutch magnet 189 moves to the left in the z-axis direction (downward in the vertical direction), the neutral mode can be implemented. In particular, when the position of the z-axis central region (central region in the vertical direction) of the clutch magnet 189 is at a position of 0, the z-axis force applied to the clutch magnet 189 becomes 0, so that the mode does not immediately go to the dehydration mode but can be positioned at a stable point.

That is, the size and arrangement of the detailed configuration of the clutch 180 according to one embodiment of the present disclosure can form three stable points, and thus, even when the supply of current to the first to third coils 1862, 1864, and 1866 is stopped, the positions of the clutch actuators 188 and 189 can be maintained.

The embodiments or other embodiments of the present disclosure described above are not mutually exclusive or distinct. The embodiments or other embodiments of the present disclosure described above may be combined or used in combination with each other in their respective configurations or functions.

For example, it means that A configuration described in a specific embodiment and/or the drawings and B configuration described in another embodiment and/or the drawings can be coupled. That is, even when the coupling between the configurations is not directly described, it means that the coupling is possible except in cases where the coupling is described as impossible.

The above detailed description should not be construed as limiting in all respects and should be considered exemplary. The scope of the present disclosure should be determined by a reasonable interpretation of the appended claims, and all changes within the equivalent scope of the present disclosure are included in the scope of the present disclosure.

The invention claimed is:

1. A washing machine drive system comprising:
a housing;
a motor stator to couple to the housing;
a rotor to face the motor stator;
an output shaft to bearing-couple to the housing;
a planetary gear set to couple to the rotor and to spline-couple to an outer surface of the output shaft;
a clutch stator to couple to the motor stator; and
a clutch actuator to spline-couple to an outer surface of the planetary gear set, and the clutch actuator is configured to be movable and face the clutch stator,
wherein the clutch stator includes a first coil, a second coil and a third coil arranged in a first direction,
the clutch actuator is configured such that:
when current is supplied to the first coil, the clutch actuator is to be fixed to the rotor and a rotational force of the rotor is provided to the output shaft at a 1:1 ratio,
when current is supplied to the third coil, the clutch actuator is to be fixed to the clutch stator, the rotational force of the rotor is reduced at a gear ratio of n:1, and the reduced rotational force is provided to the output shaft, and when current is supplied to the second coil, the clutch actuator is to disengage from the rotor or the clutch stator.

2. The washing machine drive system of claim 1, wherein the planetary gear set includes:
a sun gear to couple to the rotor,
a plurality of pinion gears to couple to an outer surface of the sun gear, and the plurality of pinion gears are spaced apart in a circumferential direction,
a ring gear having an inner surface to couple to the plurality of pinion gears and having an outer surface to spline-couple to the clutch actuator, and
a carrier to couple to the plurality of pinion gears and to spline-couple to the outer surface of the output shaft.

3. The washing machine drive system of claim 2, wherein the planetary gear set includes a sun gear bearing arranged between the carrier and the sun gear.

4. The washing machine drive system of claim 3, wherein the sun gear bearing overlaps the first and second coils in a second direction perpendicular to a longitudinal direction of the output shaft.

5. The washing machine drive system of claim 2, wherein the planetary gear set includes a ring gear bearing arranged between the carrier and the ring gear.

6. The washing machine drive system of claim 2, wherein a center area of the plurality of pinion gears is arranged between the first coil and the second coil in a second direction perpendicular to a longitudinal direction of the output shaft.

7. The washing machine drive system of claim 2, wherein the plurality of pinion gears overlap the first and second coils in a second direction perpendicular to a longitudinal direction of the output shaft, and the plurality of pinion gears do not overlap the third coil in the second direction.

8. The washing machine drive system of claim 2, wherein
an upper surface of the ring gear overlaps the third coil in a second direction perpendicular to a longitudinal direction of the output shaft, and
a lower surface of the ring gear is arranged below the first coil.

9. The washing machine drive system of claim 1, wherein the clutch actuator includes a first clutch portion disposed on an upper surface of the clutch actuator,
the clutch stator includes a second clutch portion disposed on a surface facing the upper surface of the clutch actuator, and
when current is supplied to the third coil, the first clutch portion is to couple to the second clutch portion.

10. The washing machine drive system of claim 9, wherein the clutch actuator includes a third clutch portion disposed on a lower surface of the clutch actuator,
the rotor includes a fourth clutch portion disposed on a surface facing the lower surface of the clutch actuator, and
when current is supplied to the first coil, the third clutch portion is to couple to the fourth clutch portion.

11. The washing machine drive system of claim 1, wherein the clutch actuator includes a clutch coupling portion to spline-connect to the planetary gear set, and a clutch magnet disposed in the clutch coupling portion and to face the clutch stator,
when current is supplied to the first coil and then the supply of current is stopped, coupling of the clutch actuator and the rotor is maintained,
when current is supplied to the third coil and then the supply of current is stopped, coupling of the clutch actuator and the clutch stator is maintained, and when current is supplied to the second coil and then the supply of current is stopped, decoupling of the clutch actuator and the rotor or the clutch stator is maintained.

12. The washing machine drive system of claim 11, wherein a length of the clutch magnet is between 1.8 and 2.2 times a length of each of the first coil, the second coil and the third coil.

13. The washing machine drive system of claim 1, wherein the clutch stator includes a stator coupling portion to couple to the motor stator, and a first core, a second core and a third core arranged in the stator coupling portion and arranged in the first direction or parallel to the first direction, the first coil is arranged in the first core, the second coil is arranged in the second core, and the third coil is arranged in the third core, and the first, second, and third cores are each formed in a same shape, and the first, second, and third coils are each formed in a same shape.

14. The washing machine drive system of claim 13, wherein the stator coupling portion includes a circumferential portion that extends inwardly in a circumferential direction from an upper surface of the stator coupling portion, a second clutch portion is arranged on a lower surface of the circumferential portion, and the second clutch portion overlaps the clutch actuator in the first direction or parallel to the first direction.

15. The washing machine drive system of claim 13, wherein the clutch actuator includes a clutch coupling portion to spline-couple to the planetary gear set, and a clutch magnet disposed in the clutch coupling portion and to face the clutch stator, when current is supplied to the first coil, the clutch magnet is to overlap the first coil, the second coil, the first core, and the second core in a second direction, when current is supplied to the second coil, the clutch magnet is to overlap the second coil, the first core, the second core and the third core in the second direction, and when current is supplied to the third coil, the clutch magnet is to overlap the second coil, the third coil, the second core, and the third core in the second direction.

16. The washing machine drive system of claim 13, wherein the clutch actuator includes a clutch coupling portion to spline-couple to the planetary gear set, and a clutch magnet disposed in the clutch coupling portion and to face the clutch stator, when current is supplied to the first coil, a center region of the clutch magnet is to overlap an upper region of the first coil in a second direction, when current is supplied to the second coil, the center region of the clutch magnet is to overlap a center region of the second coil in the second direction, and when current is supplied to the third coil, the center region of the clutch magnet is to overlap a lower region of the third coil in the second direction.

17. The washing machine drive system of claim 1, wherein the clutch actuator and the clutch stator are disposed between the planetary gear set and the motor stator in a second direction perpendicular to a longitudinal direction of the output shaft.

18. The washing machine drive system of claim 1, wherein the rotor includes a rotor case including a disk portion having a center to be shared with the output shaft and a cylindrical portion that extends upward from a radially outer side of the disk portion, and a rotor magnet disposed in the cylindrical portion and to face the motor stator, and the rotor magnet is to overlap the second and third coils in a second direction perpendicular to a longitudinal direction of the output shaft, and the rotor magnet does not overlap the first coil in the second direction.

19. A washing machine drive system comprising:

a housing;

a motor stator to couple to the housing;

a rotor to face the motor stator;

a shaft to couple to the housing;

a planetary gear set to couple to the rotor and to couple to the shaft;

a clutch stator to couple to the motor stator; and a clutch actuator to couple to the planetary gear set, and the clutch actuator is configured to be movable and face the clutch stator, wherein the clutch stator includes a first coil, a second coil and a third coil, based on current at the first coil, a rotational force of the rotor is to be provided to the shaft at a 1:1 ratio, based on current at the third coil, a reduced rotational force of the rotor at a gear ratio of n:1 is to be provided to the shaft, and based on current at the second coil, the clutch actuator is to disengage from the rotor or the clutch stator.

20. The washing machine drive system of claim 19, wherein the clutch actuator includes a first clutch portion disposed on an upper surface of the clutch actuator and a third clutch portion disposed on a lower surface of the clutch actuator, the clutch stator includes a second clutch portion facing the upper surface of the clutch actuator, the rotor includes a fourth clutch portion facing the lower surface of the clutch actuator, based on current at the third coil, the first clutch portion is to couple to the second clutch portion, and based on current at the first coil, the third clutch portion is to couple to the fourth clutch portion.

* * * * *